May 9, 1950  C. R. WOODLAND  2,507,429
WIPER ASSEMBLY FOR AUTOMATIC SWITCHES
AS USED IN TELEPHONE SYSTEMS
Filed April 25, 1946  2 Sheets-Sheet 1

INVENTOR
CECIL ROBERT WOODLAND
BY
ATTORNEY

May 9, 1950

C. R. WOODLAND 2,507,429

WIPER ASSEMBLY FOR AUTOMATIC SWITCHES
AS USED IN TELEPHONE SYSTEMS

Filed April 25, 1946

INVENTOR
CECIL ROBERT WOODLAND

BY
ATTORNEY

Patented May 9, 1950

2,507,429

UNITED STATES PATENT OFFICE 2,507,429

WIPER ASSEMBLY FOR AUTOMATIC SWITCHES AS USED IN TELEPHONE SYSTEMS

Cecil Robert Woodland, Liverpool, England, assignor to Automatic Electric Laboratories Inc., Chicago, Ill., a corporation of Delaware Application April 25, 1946, Serial No. 664,835
In Great Britain June 1, 1945

4 Claims. (Cl. 200—171)

1

The present invention relates to wiper assemblies and is more particularly concerned with assemblies in which the wiper blades make contact with both sides of a fixed contact.

The invention has application to wiper assemblies for all types of rotary switches but it is of particular value for automatic switches of the type used in telephone switches, more especially to those switches of the well known vertical and rotary type where the wipers are arranged to perform a vertical stepping movement and subsequently to rotate over a selected level of bank contacts. Switches of this type can readily be damaged by clumsy handling and from their position it is generally the wipers which are most readily affected. If these suffer damage, it is, with ordinary forms of construction, a somewhat laborious operation to replace them, involving as it does the breaking and remaking of a number of soldered connections.

The chief object of the invention is to provide an improved construction whereby readily renewable wiper blades are provided so that if damage should occur, repairs can be effected with the minimum of time and trouble. A further advantage is that with the possibility of readily replacing the wiper blades, it is feasible to make the wiper tips of comparatively soft metal so that almost the whole of the wear takes place on the wiper tips rather than on the fixed contacts which involve very much more trouble to replace.

According to one feature of the invention the wiper blades are separate from and pivotally mounted on the wiper assembly, a spring connection from feeder arms to which the normal wiper connections are attached being effective between the pivot point and the wiper tips whereby the wiper tips exert substantially the same pressure on the contacts after an appreciable amount of wear has taken place as they do when new.

According to a further feature of the invention, the wiper blades are separate from the wiper assembly and a spring connection is effective between the wiper assembly and the blades to provide a suitable pressure between the tips and the fixed contacts, spacing means being arranged between the two blades so that full pressure is exerted by the tips substantially immediately upon engagement with the fixed contacts.

The invention will be better understood from the following description of two embodiments which should be taken in conjunction with the accompanying drawings, comprising Figs. 1–4.

Fig. 1 shows a plan view of one wiper assembly according to the invention, while

Fig. 3 shows a plan view of a slightly modified wiper assembly according to the invention, while

Figure 1:
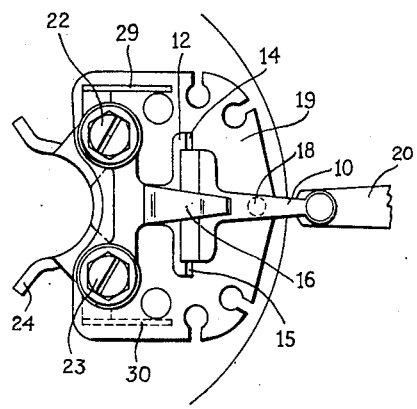
Figure 2:
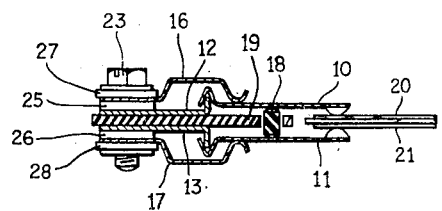
Fig. 2 shows a part-sectional elevation thereof in which for clarity both the mounting bracket and also the wiring tags are assumed to have been removed.

In Figs. 1 and 2 the wiper blades 10 and 11 are respectively supported at V formed ends on long knife-edges formed at the ends of the members 12 and 13, the knife-edges being stepped down over the length on which the wiper blades pivot so as to give raised portions 14 and 15 at each end which will prevent any sideways movement of the blades.

The blades are held in position in the assembly by a pair of springs 16 and 17 which press on that part of each wiper blade situated between the appropriate knife-edge and the floating spacing stud 18 which projects through a hole in the flat insulator 19 on which the assembly is built up. This stud serves to maintain an even contact pressure between the spoon-shaped tips of the wiper blades and the fixed contacts such as 20 and 21 with which they engage, substantially independently of the wear of the wiper tips. The various component parts are held together by the bolts 22 and 23 which extend into threaded holes in the mounting bracket 24.

As regards the electrical connection to the wiper blades 10 and 11, the springs 12, 16 and 13, 17 which respectively connect therewith are clamped by the screw-threaded bolts 22 and 23 against metal spacing collars such as 25 and 26 in such manner as to form electrically connected pairs. The bolts 22 and 23 are electrically insulated from these metal collars by means of the insulating collars 27 and 28 which respectively extend inside the metal collars 25 and 26; hence separate electrical connection on a parallel feed basis is had to each of the wiper blades 10 and 11. The connection to blade 10 extends via springs 12 and 16 in parallel and that to blade 11 via springs 13 and 17 in parallel, heavy contact pressure being maintained between the pairs of springs and the associated blade in each case. The external wiring terminates on feeder arms or tags 29 and 30 which are respectively integral with springs 12 and 13.

In the above embodiment of the invention the floating spacing stud 18 serves to maintain the wiper tips apart when they are in normal position and they are given a predetermined contact pressure against the stud. With this arrangement since the wipers give their full pressure as soon as they are lifted clear of the stud, the length of the stud i. e. the normal spacing between tips, need only be made such that on engagement with the fixed contacts, the wiper blades are just lifted clear of the stud. Only small outward movements of the tips are therefore involved as the switch wipers move over a level of contacts and contact bounce is therefore minimised. Variation of contact pressure due to mis-alignment of wiper blades to fixed contacts and to differences in tip spacing is also very small with the above construction.

Figure 3:
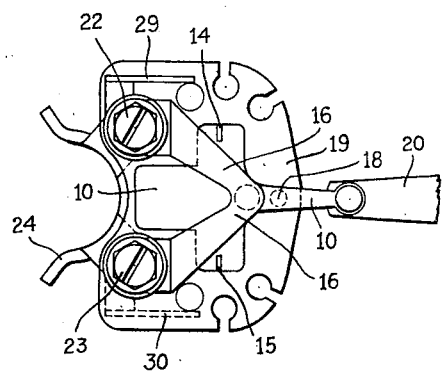
Figure 4:
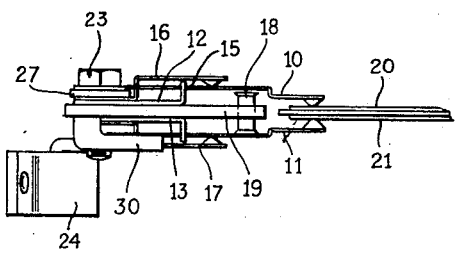
Fig. 4 shows a similar side elevation thereof including the mounting bracket.

Reference should now be had to Figs. 3 and 4 which illustrate the use of balanced detachable wiper blades by means of which the amplitude of any wiper tip vibration which occurs during vertical stepping is lessened.

In this arrangement the various elements of the assembly are given the same reference numbers as before, the anti-vibration feature being provided by virtue of the cruciform shape of the detachable blades 10 and 11 which ensures a substantial degree of balance at the main pivoting points on the members or connecting springs 12 and 13. The connecting springs are provided with a stepped knife edge as in the previous construction but the wiper blades are in this instance provided with flat pivoting surfaces, location of the blades with respect to the knife edges being effected by means of small slots at the ends of their cross arms through which the raised portions of the knife edges extend. A further difference in the construction is that the pressure springs 16 and 17 are now provided with spoon tips at the point of engagement with the contact blades 10 and 11.

We claim:

1. In a mechanical switch, a wiper assembly including a pair of fixedly supported members electrically insulated from each other, a pair of wiper blades electrically insulated from each other, said blades having heel ends removably engaging said pair of fixedly supported members and tip ends for engaging opposite conductors of a stationary contact piece, electrically insulated means for limiting a movement of one of said blades in one direction and for limiting a corresponding movement of said other blade in the opposite direction, springs electrically insulated from each other and engaging said blades under tension thereby to retain said engagement of said blades with said pair of fixedly supported members and to press said blades into engagement with said insulated movement limiting means, an engagement of said tip ends with said opposite conductors of said contact piece causing the separation of said blades from said movement limiting means.

2. In a switching mechanism, a wiper assembly including a fixedly supported terminal having two pivot members, a wiper blade cruciform in shape and having the tip of one of its longitudinal arms adapted for engaging a fixed contact, an opening near each end of the cross arm of said blade, said pivot members of said terminal engaging said openings in said cross arm of said blade, a tensioned spring engaging said longitudinal arm at a point at or near said cross arm thereby to retain said engagement of said pivot members with said openings in said cross arm, said arrangement of said members, said blade and said spring providing a substantial degree of balance along the pivotal axis thereby to lessen the amplitude of any vibration of said tip which may occur during a positioning movement of said wiper assembly preparatory to causing an engagement of said fixed contact by said tip of said longitudinal arm.

3. In a switching mechanism, a wiper assembly including a pair of fixed terminals having pivot members, a pair of wiper blades cruciform in shape, one of said blades having the tip of one of its longitudinal arms adapted to engage one side of a fixed contact, the other of said blades having the tip of one of its longitudinal arms adapted to engage the opposite side of said fixed contact, openings at or near the ends of the cross arms of said pair of blades, said pivot members of said terminals engaging said openings in said cross arms, means for providing a predetermined normal spacing of said longitudinal arms, a pair of tensioned springs engaging said longitudinal arms thereby to retain said pivot members in said engagement with said openings in said cross arms and to yieldingly retain said normal spacing of said longitudinal arms, said arrangement of said pivot members, said pair of blades, said spacing means and said pair of springs providing a substantial degree of stability for minimizing the amplitude of any vibration of said tips of said longitudinal arms that may occur during a contact positioning movement of said pair of blades, an engagement of said tips of said longitudinal arms with said opposite sides of said fixed contact overcoming said normal spacing of said longitudinal arms.

4. In a mechanical switch, a wiper assembly including a pair of springs each having one end fixedly supported and the other end terminating in a knife edge, a pair of spring blades removably pivoted on said knife edges of said pair of spring and having tip ends adapted for engaging opposite surfaces of a fixed contact element, means for providing a predetermined normal spacing of said pair of blades, a pair of tensioned springs engaging said pair of blades between the pivot points of said blades and the tip ends of said blades thereby to retain said pivoting of said pair of blades on said knife edges of said first pair of springs and to yieldingly retain said normal spacing of said pair of blades, an engagement of said tip ends of said blades with said surfaces of said fixed contact element overcoming said normal spacing of said blades, said pair of tensioned springs thereafter maintaining said tip ends of said blades in contact with said surfaces of said fixed contact element.

CECIL ROBERT WOODLAND.

REFERENCES CITED

The following references are of record in the file of this patent:

UNITED STATES PATENTS

| Number | Name | Date |
| --- | --- | --- |
| 906,733 | Peterson | Dec. 15, 1908 |
| 1,555,000 | Gibbons | Sept. 29, 1925 |

FOREIGN PATENTS

| Number | Country | Date |
| --- | --- | --- |
| 361,625 | Great Britain | Nov. 26, 1931 |
| 430,969 | Germany | June 28, 1926 |
| 456,767 | Great Britain | Nov. 16, 1936 |